(12) United States Patent
Bowden

(10) Patent No.: US 9,777,865 B2
(45) Date of Patent: Oct. 3, 2017

(54) BALANCED ELECTRONICALLY CONTROLLED PRESSURE REGULATING VALVE

(71) Applicant: Charles J. Bowden, Battle Creek, MI (US)

(72) Inventor: Charles J. Bowden, Battle Creek, MI (US)

(73) Assignee: FEMA CORPORATION OF MICHIGAN, Portage, MI (US)

( * ) Notice: Subject to any disclaimer, the term of this patent is extended or adjusted under 35 U.S.C. 154(b) by 88 days.

(21) Appl. No.: 14/663,774

(22) Filed: Mar. 20, 2015

(65) Prior Publication Data

US 2015/0292644 A1    Oct. 15, 2015

Related U.S. Application Data

(60) Provisional application No. 61/979,640, filed on Apr. 15, 2014.

(51) Int. Cl.
*F16K 31/06* (2006.01)
*F15B 13/043* (2006.01)

(52) U.S. Cl.
CPC ...... *F16K 31/0655* (2013.01); *F15B 13/0431* (2013.01); *F15B 2211/3138* (2013.01); *F15B 2211/50536* (2013.01); *F15B 2211/526* (2013.01); *F15B 2211/528* (2013.01); *F15B 2211/55* (2013.01); *F15B 2211/6653* (2013.01); *F15B 2211/6658* (2013.01); *F15B 2211/7142* (2013.01)

(58) Field of Classification Search
CPC ................................................ F16K 31/0644
USPC ........ 251/129.15, 129.03; 137/522, 500, 501
See application file for complete search history.

(56) References Cited

U.S. PATENT DOCUMENTS

| | | | |
|---|---|---|---|
| 5,284,317 A | 2/1994 | Brehm et al. | |
| 5,984,263 A | 11/1999 | Hosoya | |
| 6,679,475 B2 | 1/2004 | Rembold et al. | |
| 6,938,875 B2 | 9/2005 | Ichinose et al. | |
| 7,367,542 B2 | 5/2008 | Ichinose et al. | |
| 8,210,495 B2 | 7/2012 | Hohmann et al. | |
| 2006/0180783 A1* | 8/2006 | Tackes | F16K 3/26 251/129.15 |
| 2011/0197979 A1* | 8/2011 | Imhof | G05D 7/005 137/528 |

FOREIGN PATENT DOCUMENTS

WO    WO 2013/186859 A1    12/2013

* cited by examiner

*Primary Examiner* — Kevin Murphy
*Assistant Examiner* — Paul J Gray
(74) *Attorney, Agent, or Firm* — Flynn, Thiel, Boutell & Tanis, P.C.

(57) ABSTRACT

A sequentially operated hydraulic valve for regulating a hydraulic fluid pressure from a single pressurized hydraulic fluid source to two different regulated pressures controlled by a single linear spring and by varying the position of end of the spring relative to the other end of the spring.

10 Claims, 6 Drawing Sheets

BALANCED ELECTRONICALLY CONTROLLED PRESSURE REGULATING VALVE

CROSS REFERENCE TO RELATED APPLICATION

This claims the benefit of U.S. Provisional Application No. 61/979,640, filed Apr. 15, 2014, the disclosure of which is hereby incorporated by reference in its entirety.

FIELD OF THE INVENTION

This invention relates to a fluid pressure regulating hydraulic valve and, more particularly, to a sequentially operated multiple position fluid pressure regulating hydraulic valve for regulating fluid pressure from a single pressurized fluid source at multiple differing pressures.

BACKGROUND OF THE INVENTION

With the advent of new regulations for stricter emission control and improved fuel economy, while still maintaining overall costs, there has developed a need for new, cost effective ways of providing these reductions.

One way of providing both emissions and fuel reductions is to minimize power consumption when that power is not required. To do this, a pressure regulator is utilized which has the ability, with an electrical signal applied, to reduce its regulated pressure, either on or off or proportionally.

With this reduction in power usage, the fuel consumption is reduced in addition to overall emissions.

Accordingly, it is an object of this invention to offset the primary pressure to be regulated and applied to one side of the moveable components in the pressure regulating valve with a counter-balancing pressure equal to that of the primary pressure.

It is a further object of this invention to offset the primary pressure to be regulated and applied to one side of at least one moveable component of the valve that facilitates a connection of the primary pressurized fluid to a source of lower pressure following a movement of the component with a counter-balancing pressure equal to the pressure to be regulated so that a spring force of a spring yieldingly resists movement of the component and connection of the pressurized fluid to the source of lower pressure and thereby solely determine the pressure to which the pressurized fluid will be regulated.

It is a further object of the invention to balance the primary pressure to be regulated by applying to both sides of a moveable armature of an electromagnet with a counter-balancing pressure equal to the pressure to reduce the amount of electricity to move the armature.

It is a further object of the invention, as aforesaid, to reduce the aforesaid spring force of the spring in response to the aforesaid movement of the armature caused by an activation of the electromagnet.

SUMMARY OF THE INVENTION

The objects and purposes of the invention are met by providing a sequentially operated hydraulic valve for regulating a hydraulic fluid pressure from a single pressurized hydraulic fluid source to two different regulated pressures controlled by a single linear spring and by varying the position of the end of the spring relative to the other end of the spring.

BRIEF DESCRIPTION OF THE DRAWINGS

Other objects and purposes of the invention will be apparent to persons acquainted with apparatus of this general type upon reading the following specification and inspecting the accompanying drawings, in which.

DETAILED DESCRIPTION

Figure 1:
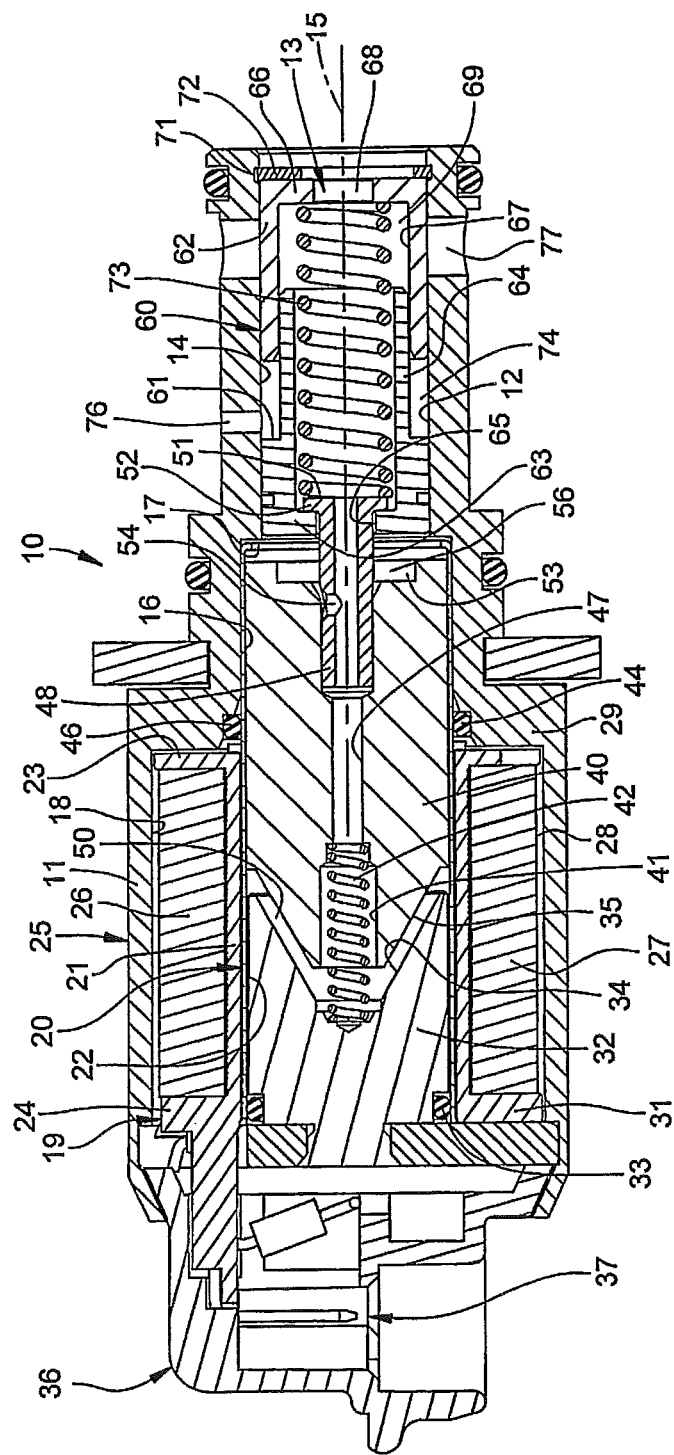
FIG. 1 illustrates a longitudinal sectional view of a hydraulic valve embodying my new invention in a dormant state.

Certain terminology will be used in the following description for convenience in reference only and will not be limiting. The words "up", "down" "right" and "left" will designate directions in the drawings to which reference is made. The words "in" and "out" will refer to directions toward and away from, respectively, the geometric center of the device and designated parts thereof. Such terminology will include derivatives and words of similar import.

FIG. 1 illustrates a hydraulic valve 10 embodying my invention, with valve in its dormant state, that is, no hydraulic pressure is being applied thereto and there is no supply of electrical energy. The valve 10 includes a valve body 11 having an elongate internal bore 12 therein opening outwardly at one end 13 of the valve body. The internal bore 12 has first segment 14 with a first inner diameter D1 and a second segment 16 with a second inner diameter D2 that is larger than the diameter D1. The first and second segments are both coaxial with a longitudinal axis 15 of the internal bore 12. The difference in the diameters D2 and D1 define a shoulder 17 that faces away from the end 13 of the valve body 11.

The second segment 16 of the internal bore 12 has a third segment 18 with an inner diameter D3 that is larger than the inner diameter D2. The third segment 18 is configured to receive therein an armature guide tube 20 made of nonmagnetic material, an electromagnet 25 which includes a hollow and cylindrical bobbin 19 made of nonmagnetic material. The bobbin 19 includes a cylindrical sleeve 21 wherein a central hole 22 is provided therethrough that is coaxial with the longitudinal axis 15 of the internal bore 12. A first wall 23 integral with the sleeve 21 protrudes radially outwardly from an end of sleeve 21 adjacent the shoulder 17. A second wall 24 also integral with the sleeve protrudes radially outwardly from an end of the sleeve 21 axially spaced from the first wall 23 to define with the radially outer surface of the sleeve 21 a trough 26. A coil 27 of electrical wire 28 is wound onto the sleeve 21 and in the trough 26 so that when electrical energy is applied to the electrical wire 28, a magnetic field will be created to thereby render the body 11 a magnetic flux path. The first pole piece includes a plate 31 of magnetic material fixed to the valve body 11 and forming an end wall of the internal bore 12 and a magnetic material pole member 32 coupled to the plate 31 and configured to be snuggly received inside the central hole 22 in the armature guide tube 20. In this particular embodiment, an O-ring seal 33 is provided between the magnetic pole member 32 and the inner diameter of the armature guide tube 20. An end of the pole member 32 facing the open end 13 of the valve body 11 has a V-shaped cavity 34 therein. The second magnetic pole piece consists of a part of the body 11 composed of the wall 29 adjacent to the bobbin wall 23 extending radially inwardly to the armature guide tube 20.

The ends of the electrical wire 28 forming the coil 27 extend through a section 36 of the valve body 11 to a conventional electrical socket construction 37.

The electromagnet 25 also includes a movable support member, namely, an armature 40 made of magnetic material and is snuggly slidably mounted in the central hole 22 for movement toward and away from the pole member 32 at one end and the shoulder 17 at the other end thereof. The end of the armature opposing the pole member 32 has a V-shaped end wall 35 conforming in shape and size to the shape and size of the V-shaped cavity 34. A pocket 41 is formed in the end of the armature 40 that opposes the pole member 32 and configured to receive one end of a linear spring 42 therein. The opposite end of the spring 42 is received in a pocket 43 in the pole member. A spring force of the linear spring 42, in this particular embodiment, is configured to not urge the other end of the armature 40 into engagement with the shoulder 17 as shown in the dormant position of the valve 10 in FIG. 1. An annular groove 44 is located in the wall of the second segment 16 of the internal bore 12 of the valve body 11 and receives an O-ring 46 which sealingly engages the outer surface of the armature guide tube 20. The armature 40 has a centrally located and longitudinally extending hole 47 therethrough that opens at one end into the pocket 41 and a volume of space 50 between the pole member 32 and the opposing surface of the armature 40.

A tube 48 having a longitudinally extending central bore 49 therethrough is connected to the end of the armature 40 adjacent the shoulder 17 to form an extension of the central hole 47 in the armature. The tube extends from the armature 40 to a distal end 51 located beyond the shoulder 17 inside the first segment 14 of the internal bore 12. An enlarged flanged end 52, also referred to as a spring abutment, larger in diameter than the outer diameter of the tube 48, is provided at the distal end 51. A pocket 53 is provided in the end face of the armature adjacent the shoulder 17 and is open to the radially outer surface of the tube 48. A passageway 54 extends through the wall of the tube 48 to connect the central bore 49 in the tube 48 to the pocket 53 and the volume of space 56 located between the end of the armature 40 and the shoulder 17 and an opening into the first segment 14 of the internal bore 12.

A cartridge 60 is slidingly and reciprocally moveably support in the first segment 14 of the internal bore 12. The cartridge includes first and second telescopically connected spool members 61 and 62 which are configured to sequentially lengthen and shorten the overall length of the cartridge 60. The first spool member 61 is located in the first segment 14 of the internal bore 12 adjacent the shoulder 17 and the second spool member 62 is located adjacent the open end 13 of the valve body 11.

The first spool member 61 is cup-shaped and has an end wall 63 and an axially extending first hollow sleeve 64 extending from the end wall 63 toward the open end 13 of the internal bore 12. The end wall 63 has a hole 65 therethrough which slidingly receives therethrough the distal end portion 51 of the tube 48 with the enlarged flanged end 52, which flanged end 52 is larger in diameter than the diameter of the hole in the end wall 63, being located inside the first hollow sleeve 64.

The second spool member 62 is cup-shaped and has a second wall 66 with a first cross sectional area facing the open end 13 and an axially extending second hollow sleeve 67 extending from the end wall 66 away from the open end 13 of the internal bore and toward the first spool member 61. In this particular embodiment, the internal diameter of the second hollow sleeve 67 is just slightly greater than the outer diameter of the first hollow sleeve 64 so that the second hollow sleeve 67 telescopically overlaps the first hollow sleeve 64 and facilitates the telescopic relative movement mentioned above. Correspondingly, an internally facing side of the end wall 66 and its second cross sectional area is less than the first cross sectional area. The second end wall 66 has a hole therethrough to provide a passageway from the open end 13 of the internal bore 12 to the interior space 69 between the end walls 63 and 66 of the two cup-shaped spool members 61 and 62.

In this particular embodiment, the wall of the first segment 14 of the internal bore has an annular groove 71 located intermediate the second end wall 66 of the second cup-shaped spool member 62 and the open end 13 of the internal bore 12. An annular spring clip 72 is received in the groove 71 to form an abutment. A linear spring 73 is provided in the interior space 69 of the cartridge 60 with one end engaging the enlarged flanged end or spring abutment 52 of the hollow tube 48 and the other end engaging a side of the second end wall 66 remote from the abutment ring 72 to urge the opposite side of the end wall 66 into engagement with the abutment ring 72.

In this particular embodiment, the wall of the first segment 14 of the internal bore has an annular groove 71 located intermediate the second end wall 66 of the second cup-shaped spool member 62 and the open end 13 of the internal bore 12. An annular spring clip 72 is received in the groove 71 to form an abutment. A linear spring 73 is provided in the interior space 69 of the cartridge 60 with one end engaging the distal end 51 of the hollow tube 48 and the other end engaging a side of the second end wall 66 remote from the abutment ring 72 to urge the opposite side of the end wall 66 into engagement with the abutment ring 72.

Figure 6:
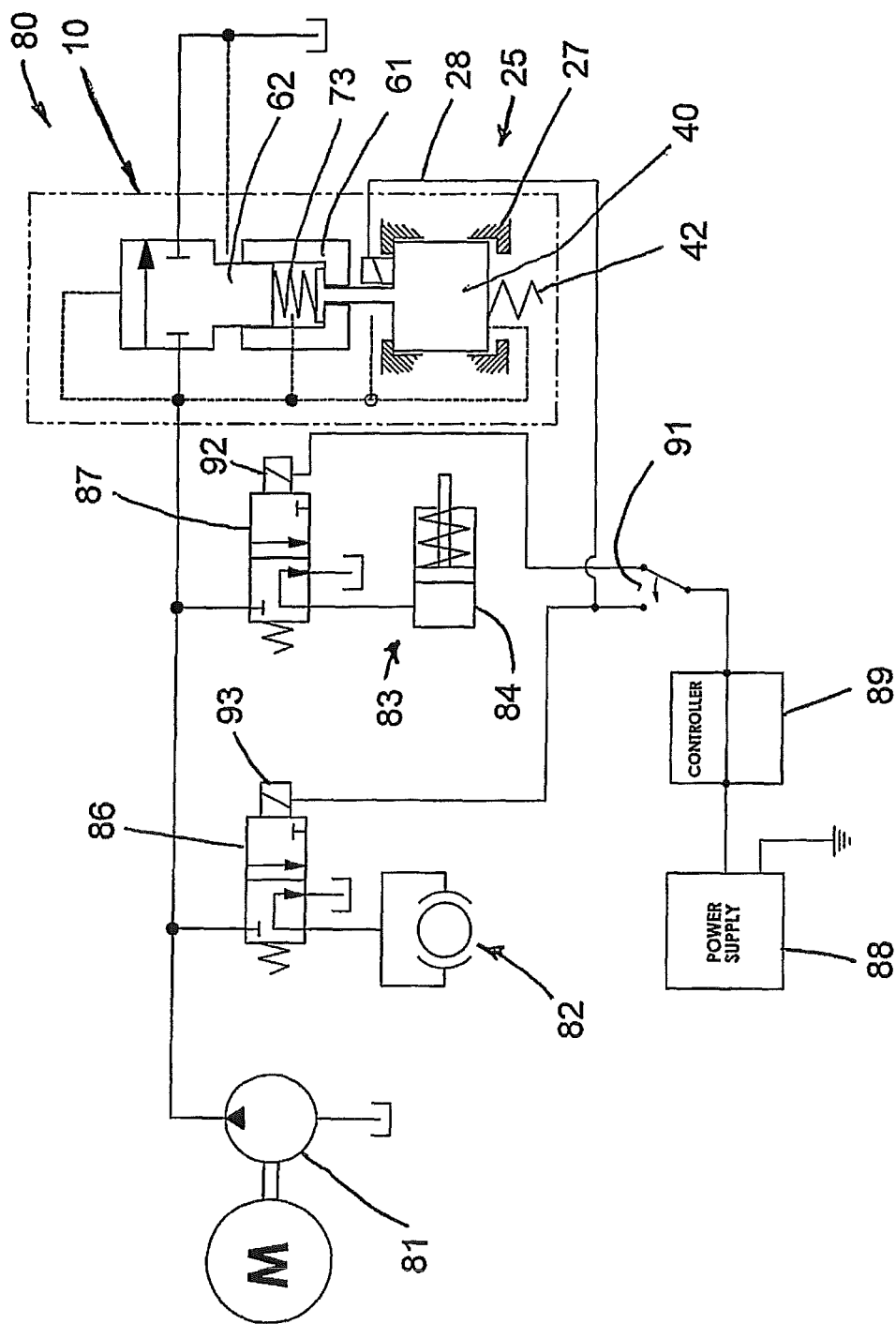
FIG. 6 is a hydraulic and electrical control circuit diagram.

The diameter of the first end wall 63 is greater than the outer diameter of the first hollow sleeve 64 whereas the diameter of the second hollow sleeve 67 equals the diameter of the first end wall 63. Thus, the difference in diameters between the outer diameter of the first hollow sleeve 64 and the outer diameter of the second hollow sleeve 67 and the axial spacing between a distal end of the second hollow sleeve 67 and the first end wall 63 coupled with the internal wall of the first segment 14 of the internal bore 12 defines a volume of space 74. A passageway 76 is provided in the wall of the first segment 14 of the internal bore 12 to continually vent the volume of space 74 through the passageway 76 to a source of reduced pressure, such as to tank pressure in a hydraulic circuit as depicted in FIG. 6. A further plurality of passageways 77 are provided in the wall of the first segment 14 of the internal bore 12 at a location that is initially blocked by the outer surface of the cup-shaped spool member 62. The further passageway 77, like the passageway 76, is continually connected to a source of reduced pressure, such as to tank pressure in a hydraulic circuit.

FIG. 6 is a sample hydraulic circuit and electrical circuit diagram 80 to be used with the inventive valve 10. The circuit 80 includes an electric motor M which drives a hydraulic pump 81 to deliver pressurized hydraulic fluid to, for example, vehicle parking brakes 82 and other equipment on the vehicle, such as a power lift system 83 having a hydraulic cylinder 84. The brakes 82 are controlled by a solenoid operated control valve 86. The power lift system 83 is controlled by a further solenoid operated control valve 87. A source 88 of electrical energy is connected through a controller 89 to a switch 91 for controlling the flow of electricity of the respective solenoids on the control valves 86 and 87 and the electrical wiring 28 forming the coil 27 on the inventive valve 10. In this particular hydraulic circuit and electrical control circuit 80, a first position of the switch 91, as shown in FIG. 6, delivers electrical energy to the solenoid 92 on the control valve 87 to shift the control valve 87 to supply pressurized hydraulic fluid to the hydraulic cylinder 84. A second position of the switch 91 delivers electrical energy to the solenoid 93 on the control valve 86 to supply pressurized hydraulic fluid to the parking brakes 82 and the electrical wiring 28 forming the coil 27 on the valve 10. The purpose of the inventive valve 10 will be explained in the following description of the operation of the valve 10.

OPERATION

While the operation of the valve 10 and circuit diagram 80 will be understood by those skilled in the art, the below set forth description of the operation is being provided only for convenience in understanding.

Figure 2:
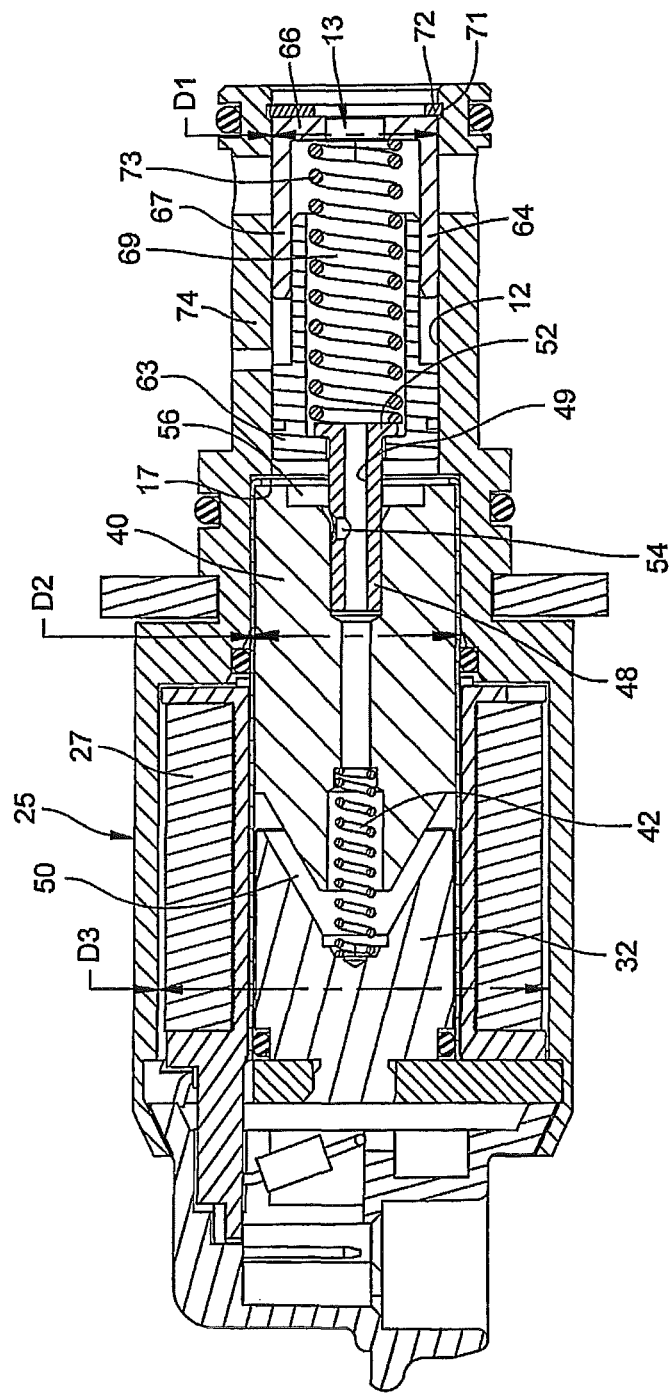
FIG. 2 is a view similar to FIG. 1 with valve in a first operative state.
Figure 3:
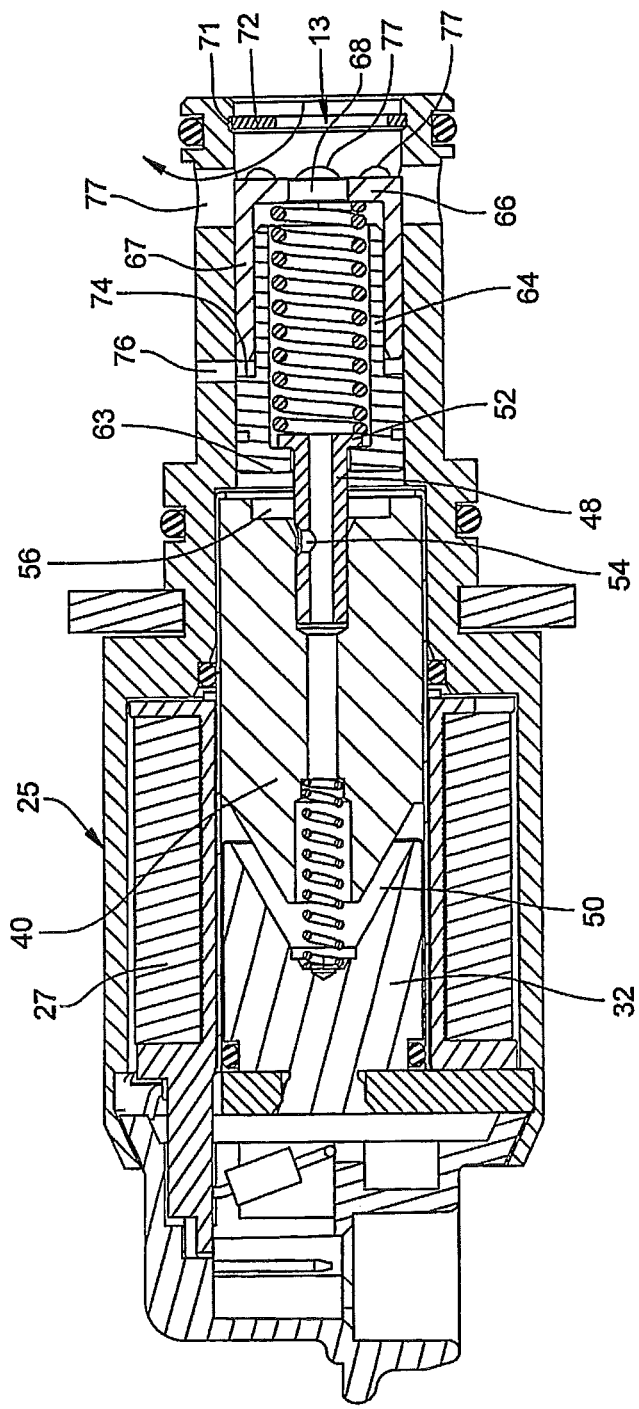
FIG. 3 is a view similar to FIG. 2 with the valve in a third fluid pressure venting operative state venting the hydraulic pressure to a first fluid pressure level.
Figure 4:
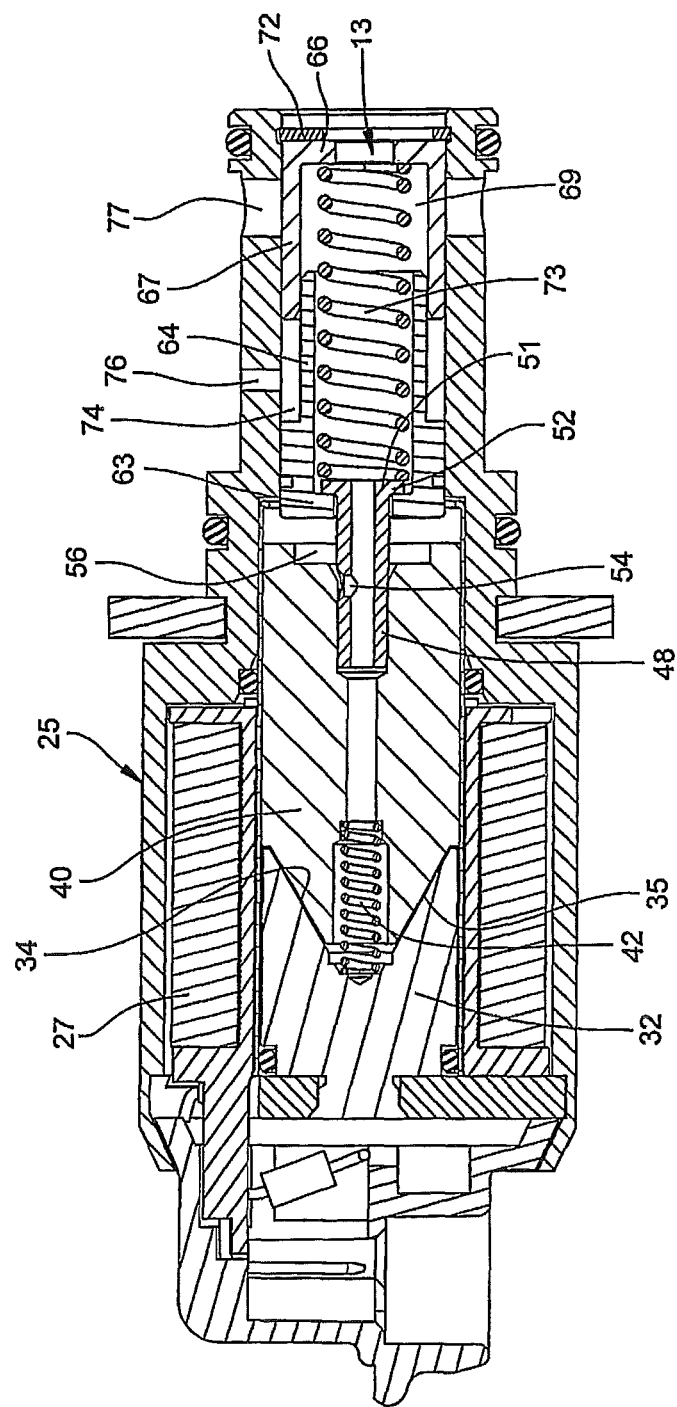
FIG. 4 is a view similar to FIG. 2 with the valve in a fourth operative state.

As stated above, the hydraulic valve 10 illustrated in FIG. 1 is in a dormant state. As depicted in this figure, the spring forces of the spring 42 and the spring 73 are in a balanced state, namely, they are at this time exerting the same load. When the electric motor M is activated, the pump 81 will supply pressurized hydraulic fluid to the open end 13 of the internal bore 12. The pressurized hydraulic fluid will enter the interior space 69 of the cartridge 60, the interior of the hollow tube 48, the interior of the hole 47 through the armature 40 and the volume of space 50 between the pole member 32 and the opposing face of the armature 40. The pressurized fluid will also enter the passageway 54 in the hollow tube 48 and pocket 53 to volume 56 offsetting the pressurized volume of space 50 working on the armature 40. The pressurized volume 56 will drive the first end wall 63 of the first spool member 61 into engagement with the flanged end 52 on the hollow tube 48. The linear spring 73 will maintain the second end wall 66 in engagement with the abutment ring 72. As the hydraulic pressure being supplied to the valve 10 continues to increase, eventually the hydraulic pressure will reach a level wherein the pressure differential between the pressure on the side of the first end wall 63 that is in engagement with the flanged end or spring abutment 52 on the hollow tube 48 and the hydraulic pressure on the opposite side of the first end wall 63 inside the interior space 69 of the cartridge 60 coupled with the volume of space 74 being continually connected to a source of reduced pressure, such as tank pressure, through the passageway 76, the first end wall 63 will be moved outwardly of the valve 10 towards the abutment ring 72 to compress the linear spring 73 until spring 42 urges the armature into contact with shoulder 17 as depicted in FIG. 2. As hydraulic pressure continues to increase the hydraulic pressure on the second end wall 66, which is engaged with the abutment ring 72 and the hydraulic pressure on the opposite side of the second end wall 66 inside the interior space 69 of cartridge 60 being coupled with the volume space 74, will be moved inwardly of the valve 10 away from the abutment ring 72 to compress the linear spring 73 until the second end wall opens the passageways 77 to facilitate a venting of the hydraulic fluid to tank through the passageways 77 resulting in a limiting of the hydraulic fluid pressure to a selected high pressure controlled solely by the spring force of the spring 73 as depicted in FIG. 3. This high pressure hydraulic fluid will be available to operate the hydraulic cylinder 84 of a lift system 83 on the vehicle when the switch 91 is moved to the rightmost position shown in FIG. 6.

Figure 5:
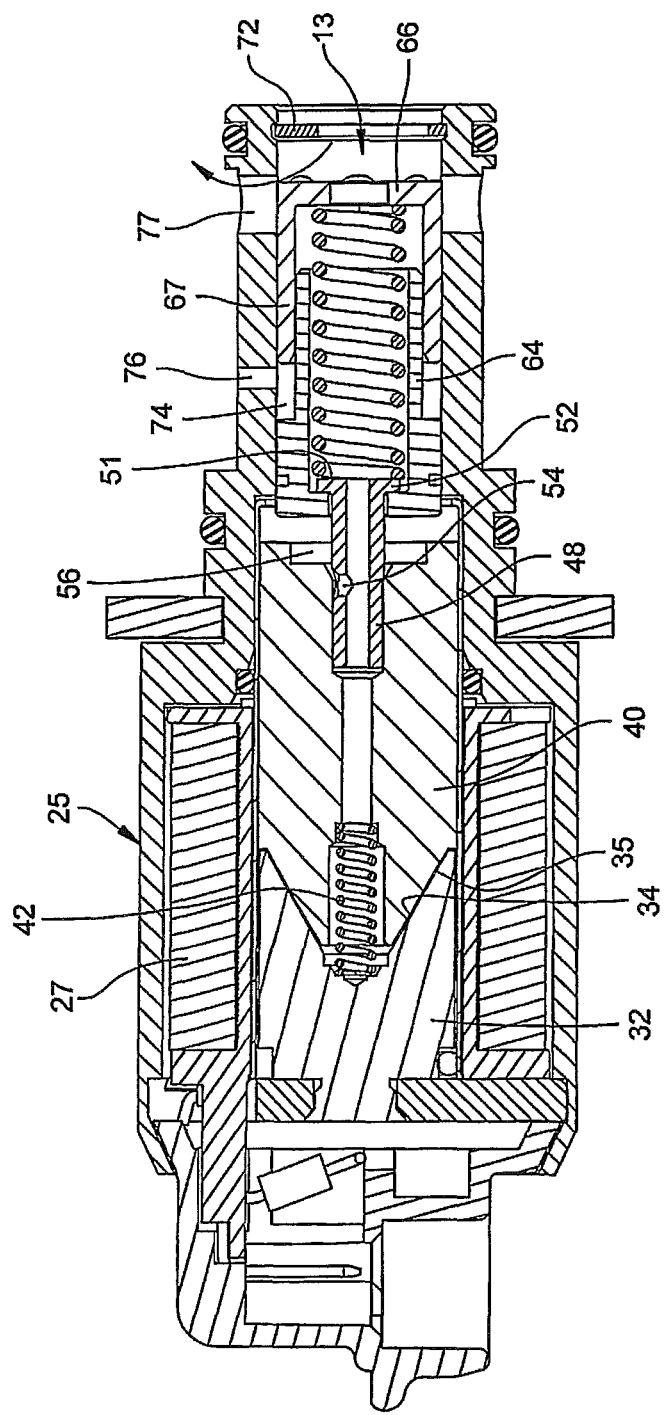
FIG. 5 is a view similar to FIG. 4 with the valve in a fifth fluid pressure venting operative state venting the hydraulic pressure to a second fluid pressure level.

When the driver of the vehicle activates the parking brakes 82, the controller 89 activates the switch 91 to facilitate the electrical activation of the solenoid 93 on the control valve 86 to cause hydraulic fluid pressure to be applied to the parking brakes 82. Simultaneously, the solenoid 92 is deactivated and electrical energy is supplied to the coil 27 of the electromagnet 25 to generate a magnetic field to pull the armature 40 away from the shoulder 17 and the surface of the V-shaped end 35 of the armature 40 into engagement with the surface of the V-shaped cavity 34 in the pole member 32. This movement of the armature 40 will cause a corresponding movement of the flanged end 52 on the hollow tube 48 and the first end wall 63 away from the second end wall 66 of the cartridge assembly 60 to reduce the spring force of the linear spring 73 and the force required to move the second end wall to open the passageways 77 to vent the hydraulic fluid through the passageways 77 to tank as depicted in FIG. 5. Thus, the level of pressure of the hydraulic pressure is reduced to a second pressure less than the higher pressure. This reduced pressure level is sufficient to maintain the activation of the parking brakes 82. The deactivation of the solenoid 92 controlling the control valve 87 results in a blockage of the flow of hydraulic fluid to the hydraulic cylinder 84.

When the regulated pressure level is reduced, the electric motor driving the pump 81 does not need to work as hard and the consumption of electrical energy driving the motor M is lessened. In addition, the size and weight of the coil 27 on the valve 10 is minimized because the hydraulic pressure applied to both ends of the armature 40 and cartridge 60 reduces the force necessary and consequently a reduction in the electrical energy required to move the armature 40 into engagement with the pole member 32 to only that force necessary to overcome spring 42 load. This spring load is established by the mass of the components plus any external vibration or stability requirements.

While the above disclosure relates to an armature movable between two positions, namely, one position engaging the shoulder 17 and the other position engaging the pole member 32, it is to be understood that the scope of this disclosure will include an electromagnet 25 that can be energized by a pulse width modulated electric signal, or the like, so that the armature 40 will move to positions intermediate the shoulder 17 and pole member 32 against the spring force of the linear spring 42 resulting in a hydraulic pressure regulation intermediate the high and low pressures mentioned above.

Although a particular preferred embodiment of the invention has been disclosed in detail for illustrative purposes, it will be recognized that variations or modifications of the disclosed apparatus lie within the scope of the present invention.

I claim:

1. A sequentially operated hydraulic valve operable between two positions for regulating fluid pressure from a single pressurized fluid source, comprising:

an elongate housing having a lengthwise extending internal bore therein that opens outwardly at least at one end, said open end being connected to the single pressurized fluid source;

a spool reciprocally mounted in said internal bore and consisting of a first cup-shaped piston member and a second cup-shaped piston member that are telescopically slidably connected to one another and reciprocal in said internal bore, a reduced diameter axially extending tubular sleeve on said first cup-shaped piston member extending into an interior of said second cup-shaped piston member and configured to lengthen and shorten an overall length of said telescopically connected first and second cup-shaped piston members while said first and second cup-shaped piston members remain reciprocally movable in said internal bore;

said first cup-shaped piston member having a first end wall, said second cup-shaped piston member having a second end wall with a through hole therein;

a substantially linear spring being compressed inside said first and second piston members for continually urging a lengthening of the overall length of said first and second piston members, a first end of said linear spring engaging said second end wall, and a second end of said linear spring engaging a spring abutment that is separate from said first and second cup-shaped piston members and supported for relative movement with respect to said first and second cup-shaped members;

a first port to said internal bore continually connected to a source of low pressure, radial exterior and axial facing surfaces of said first and second cup-shaped piston members being axially spaced and opposing one another to define, with an interior wall surface of said internal bore, a low pressure volume that is continually connected through said first port to the source of low pressure;

a second port to said internal bore continually connected to said source of low pressure, said second end wall of said second cup-shaped piston member having a first cross sectional area facing said open end of said internal bore, said second end wall having a second cross sectional area smaller than said first cross sectional area and oppositely facing from said first cross sectional area, said first cross sectional area of said second end wall being urged into engagement with an abutment by said linear spring so that said second end wall will provide a resistance to the pressurized fluid having access to said second port;

a passageway configured to facilitate a supply of pressurized fluid to an interior of said first and second cup-shaped piston members housing said linear spring as well as to oppositely facing surfaces of said first and second end walls to thereby facilitate the pressurized fluid causing a movement of said second end wall solely against the urging of the spring force of said linear spring toward said first end wall and a locating of said second end wall adjacent said second port to vent pressurized fluid thereto to regulate the pressure of said pressurized fluid; and a moveable support member operatively connected to said spring abutment for changing the overall length of said linear spring resulting in a changing of the spring force of said linear spring urging said first cross sectional area of said second end wall into engagement with said abutment to thereby facilitate a movement of said second end wall to said location adjacent said second port to vent pressurized fluid thereto at differing pressures determined by the position of said moveable support member and operatively connected spring abutment and solely by the adjusted spring force of said linear spring.

2. The valve according to claim 1, wherein said internal bore of said housing has a first inner diameter and includes a contiguous coaxial second internal bore segment that is of a second diameter larger than said first diameter, a difference in said first and second diameters defining a shoulder facing away from said open end, wherein said moveable support member is an electrically operated servo-motor having an output member that is movable to varying positions between first and second positions, said output member having a connection member configured to engage said first end wall to facilitate movement of said first end wall with said movement of said output member until said output member engages said shoulder.

3. The valve according to claim 2, wherein said servo-motor is a solenoid, said output member thereof being moveable to one of said first and second positions independently of said first and second cup-shaped piston members.

4. The valve according to claim 2, wherein said internal bore includes a third internal bore segment that is of a third diameter larger than said second diameter, wherein said solenoid is comprised of a nonmagnetic bobbin received in said third diameter segment of said third internal bore segment and having an annular coil of electrical wire wound on a radially outer side of said bobbin, a first central hole through said bobbin, a first magnetic pole piece oriented adjacent a first axial end face of said annular coil and a second magnetic pole piece oriented adjacent a second end face of said annular coil and an axially extending cylindrical third magnetic member coupled to said first pole piece.

5. The valve according to claim 4, wherein said output member includes a cylindrical armature of magnetic material rectilinearly movably displaceably mounted in said first central hole for movement toward and away from said first magnetic pole piece opposing one end of said armature and toward and away from said shoulder that opposes an opposite end of said armature, said armature having a second central hole therethrough and a hollow tube extension of said second central hole projecting therefrom and into said first inner diameter segment of said internal bore and having an enlarged diameter flanged end defining said spring abutment at a distal end thereof; said first end wall having a hole therethrough and slidingly receiving said hollow tube therethrough, said spring abutment of said hollow tube being oriented on a side of said first end wall remote from said armature and having a diameter that is greater than a diameter of said hole in said first end wall.

6. The valve according to claim 5, wherein said linear spring is compressed between said spring abutment and said second cross-sectional area of said second end wall.

7. The valve according to claim 5, wherein said solenoid includes a further linear spring oriented between first magnetic pole piece and said armature opposing same for urging said armature and said first magnetic pole piece away from one another to define a space therebetween communicating with said second central hole and said hollow tube extension of said second central hole, said interior of said first and second cup-shaped piston members and said through hole in said second end wall and the pressurized fluid.

8. The valve according to claim 7, wherein said solenoid includes a further passageway through a wall of said hollow tube to a space between an end of said armature adjacent said shoulder and said first end wall so that pressurized fluid is supplied to said space to urge said first end wall into engagement with said flanged end on said hollow tube.

9. The valve according to claim 8, wherein said armature is balanced in response to pressurized fluid being supplied to said space between said armature and said first end wall and to a space between said first magnetic pole piece and said armature.

10. The valve according to claim 9, wherein said armature is responsive to electrical energy being supplied to said annular coil by moving into engagement with said first magnetic pole piece against an urging of a spring force provided by said further spring resulting in said changing of the spacing between said spring abutment and said second end wall and a resulting reduction of the spring force of said linear spring urging said first cross-sectional area of said second end wall into engagement with said abutment so as to facilitate a regulation of the pressure of the pressurized fluid to a second pressure less than said first pressure.

* * * * *